United States Patent
Pitty et al.

(10) Patent No.: US 11,670,336 B2
(45) Date of Patent: Jun. 6, 2023

(54) MAGNETIC BEARINGS FOR DATA STORAGE DEVICES

(71) Applicant: Seagate Technology LLC, Fremont, CA (US)

(72) Inventors: Aravind Pitty, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 71 days.

(21) Appl. No.: 17/065,991

(22) Filed: Oct. 8, 2020

(65) Prior Publication Data

US 2022/0115040 A1    Apr. 14, 2022

(51) Int. Cl.
*G11B 19/20* (2006.01)
*H02K 7/09* (2006.01)
*F16C 32/04* (2006.01)

(52) U.S. Cl.
CPC ...... *G11B 19/2009* (2013.01); *F16C 32/0431* (2013.01); *H02K 7/09* (2013.01); *F16C 2370/12* (2013.01); *F16C 2380/00* (2013.01)

(58) Field of Classification Search
None
See application file for complete search history.

(56) References Cited

U.S. PATENT DOCUMENTS

| | | | |
|---|---|---|---|
| 4,114,960 A | 9/1978 | Habermann et al. | |
| 5,195,877 A * | 3/1993 | Kletschka | F04D 29/186 600/16 |
| 5,545,937 A * | 8/1996 | Dunfield | F16C 32/0425 310/67 R |
| 5,563,871 A | 10/1996 | Bargerhuff et al. | |
| 5,619,083 A | 4/1997 | Dunfield et al. | |
| 5,675,201 A * | 10/1997 | Komura | F16C 32/0402 310/90 |
| 5,710,469 A | 1/1998 | Ries | |
| 5,783,886 A * | 7/1998 | Hong | F16C 32/0425 310/90.5 |
| 5,808,839 A * | 9/1998 | Dunfield | G11B 5/5521 |
| 5,994,803 A * | 11/1999 | Jung | F16C 41/008 384/114 |
| 6,215,219 B1 * | 4/2001 | Hwang | F16C 39/063 310/90 |
| 6,617,732 B1 * | 9/2003 | Lin | F16C 32/0429 310/90.5 |
| 6,806,605 B1 * | 10/2004 | Gabrys | H02K 7/09 310/90 |
| 8,513,826 B2 * | 8/2013 | Mazur | F03D 9/25 417/423.4 |
| 8,564,164 B2 * | 10/2013 | Kim | H02K 7/09 310/90.5 |

(Continued)

FOREIGN PATENT DOCUMENTS

| | | | | |
|---|---|---|---|---|
| CN | 103775287 A | * | 1/2013 | |
| TW | 2009-05094 A | * | 2/2009 | |

*Primary Examiner* — Craig A. Renner
(74) *Attorney, Agent, or Firm* — Faegre Drinker Biddle & Reath LLP (57) ABSTRACT

A hard disk drive includes a base deck that is coupled to a cover, a motor assembly that is coupled to the base deck, and magnetic recording media that is coupled to the motor assembly. The motor assembly includes a magnetic bearing with a horizontal magnetic bearing component and a vertical magnetic bearing component.

15 Claims, 5 Drawing Sheets

(56) References Cited

U.S. PATENT DOCUMENTS

| | | | |
|---|---|---|---|
| 10,030,701 B2* | 7/2018 | Helgesen | F16C 32/0425 |
| 10,357,748 B2* | 7/2019 | Rozy | B01F 33/4535 |
| 2002/0070617 A1* | 6/2002 | Kanebako | F16C 17/107 |
| | | | 310/90.5 |
| 2002/0158529 A1 | 10/2002 | Liu et al. | |
| 2003/0155830 A1* | 8/2003 | Beyer | F16C 32/0436 |
| | | | 310/90.5 |
| 2008/0074010 A1* | 3/2008 | Jungmayr | F04D 25/0653 |
| | | | 318/632 |
| 2008/0100155 A1* | 5/2008 | Engesser | F16C 25/045 |
| | | | 310/46 |
| 2008/0143205 A1* | 6/2008 | Pulnikov | H02K 7/09 |
| | | | 384/114 |
| 2008/0174119 A1* | 7/2008 | Hu | F16C 39/066 |
| | | | 290/55 |
| 2008/0317398 A1* | 12/2008 | Ishigami | F16C 32/0476 |
| | | | 384/448 |
| 2009/0146515 A1* | 6/2009 | Popov | F16C 39/063 |
| | | | 310/90.5 |
| 2010/0086374 A1* | 4/2010 | Roders | B23Q 15/22 |
| | | | 409/132 |
| 2010/0148600 A1* | 6/2010 | Bauer | H02K 7/09 |
| | | | 310/90 |
| 2012/0293028 A1* | 11/2012 | Kim | F16C 32/0423 |
| | | | 384/129 |
| 2012/0306304 A1* | 12/2012 | Kim | F16C 33/746 |
| | | | 310/90.5 |
| 2013/0106208 A1* | 5/2013 | Yamada | H02K 16/02 |
| | | | 310/43 |
| 2020/0336041 A1* | 10/2020 | Severson | F16C 32/0451 |
| 2022/0072296 A1* | 3/2022 | Mori | F16C 17/10 |

* cited by examiner

MAGNETIC BEARINGS FOR DATA STORAGE DEVICES

SUMMARY

In certain embodiments, a hard disk drive includes a base deck that is coupled to a cover, a motor assembly that is coupled to the base deck, and magnetic recording media that is coupled to the motor assembly. The motor assembly includes a magnetic bearing with a horizontal magnetic bearing component and a vertical magnetic bearing component.

In certain embodiments, a motor assembly includes a stationary component that is coupled to or that includes a first magnetic pole having a first magnetic polarity. The motor assembly includes a rotatable component that is coupled to or that includes a second magnetic pole having a second magnetic polarity that repels the first magnetic polarity. The first magnetic pole and the second magnetic pole are arranged with respect to each other to form a first pair of repelling magnetic poles to create a horizontal magnetic bearing component. The motor assembly includes a second pair of repelling magnetic poles to create a vertical magnetic bearing component.

In certain embodiments, a base deck for a hard disk drive includes a floor portion and side wall portion. A motor assembly is coupled to the floor portion and includes a stationary component and a rotatable component. The motor assembly includes a magnetic bearing with a horizontal magnetic bearing component and a vertical magnetic bearing component. The magnetic bearing is arranged such that the rotatable component levitates and does not contact the stationary component.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use rotatable motors to rotate magnetic media. These motors typically include fluid dynamic bearings or ball bearings. However, both types of bearings use lubricants that contain oil that can leak out of the motor and degrade performance of the data storage devices. Certain embodiments of the present disclosure are accordingly directed to motors that do not necessarily require oil-based lubricants. More particularly, certain embodiments feature motors with magnetic bearings.

Figure 1:
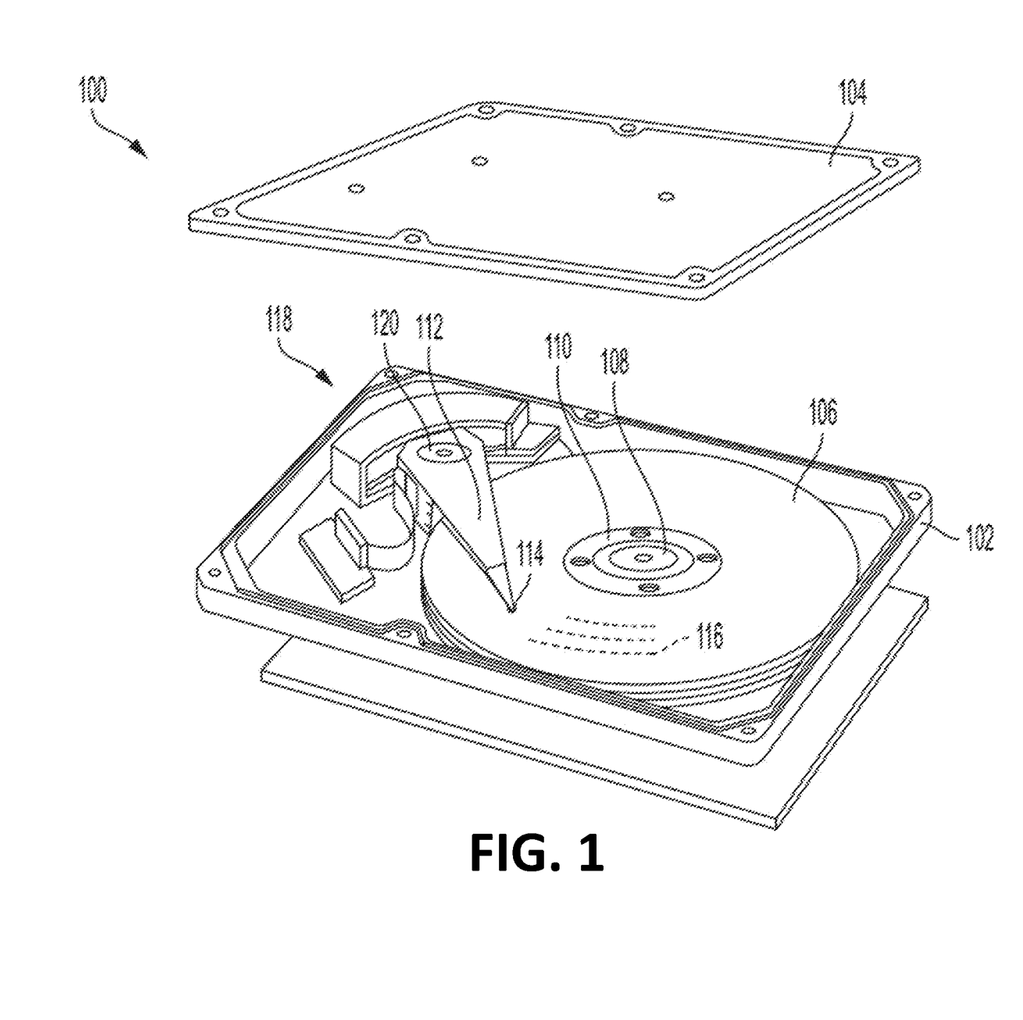
FIG. 1 shows an exploded, perspective view of a hard disk drive, in accordance with certain embodiments of the present disclosure.
Figure 2:
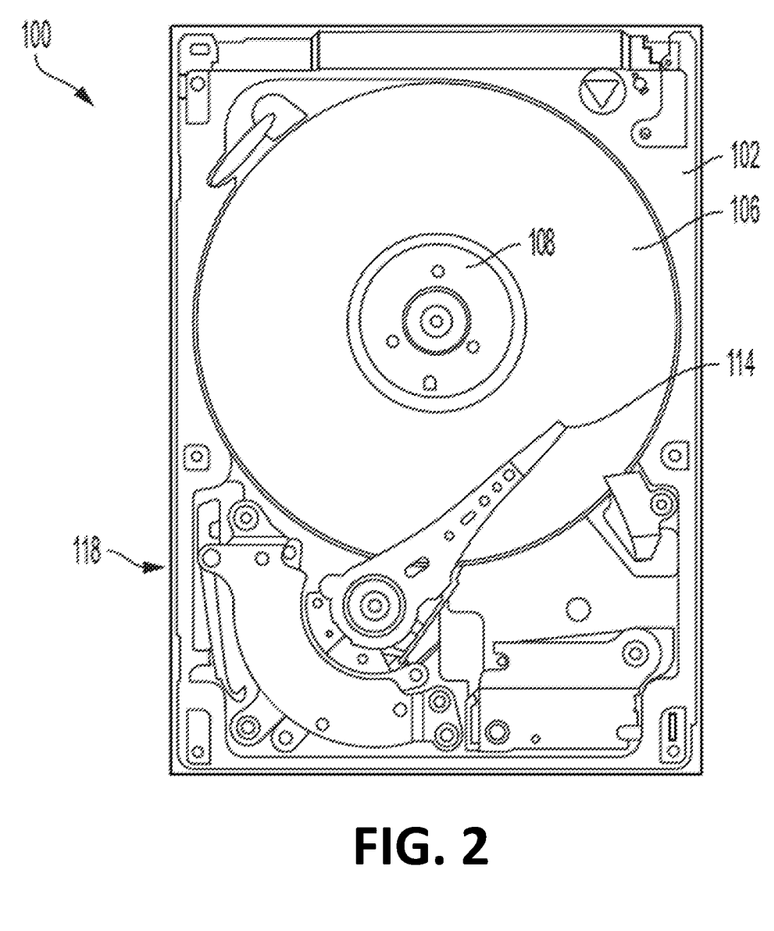
FIG. 2 shows a top view of the hard disk drive of FIG. 1, in accordance with certain embodiments of the present disclosure.

FIG. 1 shows an exploded, perspective view of a hard disk drive 100 having a base deck 102 and a top cover 104 that creates an enclosure that houses various components of the hard disk drive 100. FIG. 2 shows a top view of the hard disk drive 100. Not all components shown in FIG. 1 are shown in FIG. 2, and vice versa.

The hard disk drive 100 includes magnetic recording media 106 (individually referred to as a magnetic recording medium) coupled to a motor assembly 108 by a disk clamp 110. The hard disk drive 100 also includes an actuator assembly 112 that positions read/write heads 114 over data tracks 116 on the magnetic recording media 106. During operation, the motor assembly 108 rotates the magnetic recording media 106 while the actuator assembly 112 is driven by a voice coil motor assembly 118 to pivot around a pivot bearing 120.

The read/write heads 114 write data to the magnetic recording media 106 by generating and emitting a magnetic field towards the magnetic recording media 106 which induces magnetically polarized transitions on the desired data track 116. The magnetically polarized transitions are representative of the data. The read/write heads 114 sense (or "read") the magnetically polarized transitions with a magnetic transducer. As the magnetic recording media 106 rotates adjacent the read/write heads 114, the magnetically polarized transitions induce a varying magnetic field into a magnetic transducer of the read/write heads 114. The magnetic transducer converts the varying magnetic field into a read signal that is delivered to a preamplifier and then to a read channel for processing. The read channel converts the read signal into a digital signal that is processed and then provided to a host system (e.g., server, laptop computer, desktop computer).

Figure 3:
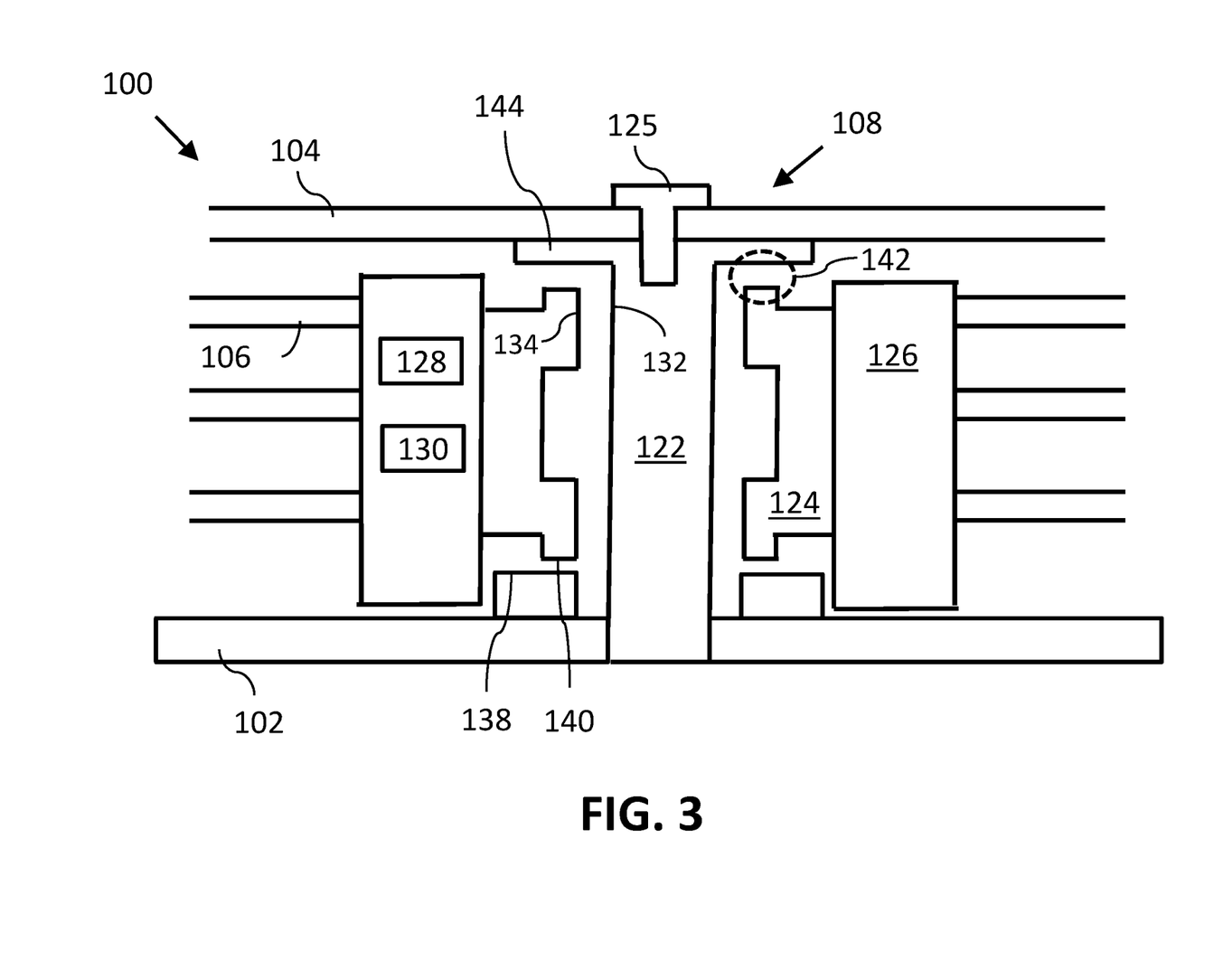
FIG. 3 shows a schematic sectional side view of a motor, in accordance with certain embodiments of the present disclosure.
Figure 4:
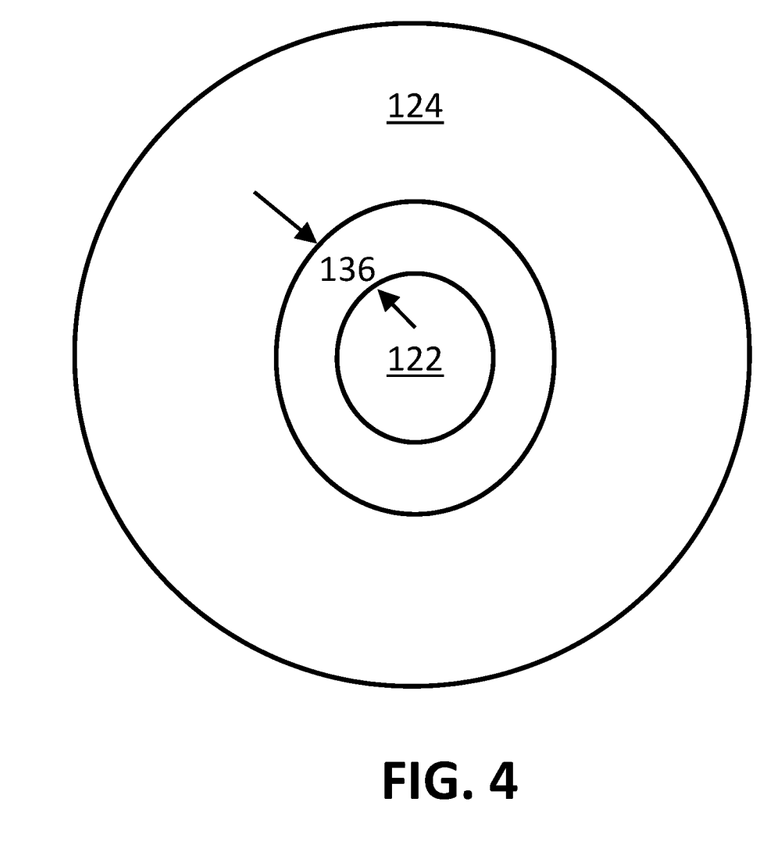
FIG. 4 shows a schematic top view of portions of the motor of FIG. 3, in accordance with certain embodiments of the present disclosure.

FIG. 3 shows a side cut-away view of the hard disk drive 100 and the motor assembly 108. FIG. 4 shows a top view of a portion of the motor assembly 108. The motor assembly 108 includes a stationary component and a rotatable component. As will be described in more detail below, the rotatable component can rotate relative to the stationary component of the motor assembly 108 and work together to form a bearing that allows for smooth rotation of the motor assembly 108. The bearing shown in FIG. 3 is a magnetic bearing as opposed to a fluid-dynamic bearing or ball bearing.

In the example shown in FIG. 3, the stationary components are a shaft 122 (e.g., cylinder-shaped shaft) and the rotatable component is a rotor 124 that may have a toroidal-shaped structure that, at least partially, surrounds the shaft 122. The shaft 122 extends between the floor of the base deck 102 and the top cover 104. For example, the shaft 122 can be coupled to the floor by securing (e.g., adhering, welding, press-fitting, fastening) the shaft 122 to the floor. The shaft 122 can also be coupled to the top cover 104 via different means such as by a fastener 125.

The rotor 124 is coupled to or includes a hub 126. The magnetic recording media 106 are coupled to the hub 126.

As such, when the hub 126 rotates, the magnetic recording media 106 and the rotor 124 also rotate. The particular shapes and relative positions of the components of the motor assemblies can be different than those shown in the Figures. For example, the rotor 124 may have a single internal surface that faces the shaft 122 such that the gap between the shaft 122 and the rotor 124 is uniform along most or all of the shaft 122.

The rotor 124 is caused to rotate by an electromagnetic motor portion of the motor assembly 108. In certain embodiments, the motor assembly 108 includes magnets 128 (e.g., permanent magnets) and stator windings 130. When the stator windings 130 are selectively energized (e.g., by applying a current to the stator windings 130), the magnets 128 interact with the magnetic fields created by the energized stator windings 130 to cause the hub 126 to rotate. The magnets 128 may be formed as a unitary annular ring or may be formed as a plurality of individual magnets that are spaced about the periphery of hub 126. The magnets 128 are magnetized to form two or more magnetic poles. Additional details about the electromagnetic motor portion can be found in U.S. Pat. No. 9,196,294, which is hereby incorporated by reference for the purposes of providing additional details about the electromagnetic motor portion of the motor assemblies described herein.

As noted above, components coupled to (or portions part of) the shaft 122 and the rotor 124 form a magnetic bearing—as opposed to a fluid-dynamic bearing or ball bearing. In particular, the magnetic bearing is formed by one or more pairs of repelling magnetic poles positioned at various places along the shaft 122 and the rotor 124. These repelling magnetic poles cause the rotor 124 to levitate or float such that there are gaps (e.g., air gaps) between the shaft 122 and the rotor 124 and such that the shaft 122 and the rotor 124 do not physically contact each other. Because the shaft 122 and the rotor 124 do not contact each other, the motor assembly 108 does not necessarily require use of a lubricant between the shaft 122 and the rotor 124 components.

As noted above, lubricants can leak out of motors and into enclosures of hard disk drives. Leaked oil can contaminate components of hard disk drives and cause errors or even failures. Further, lubricants' properties (e.g., viscosity, dampening) can vary with temperature and therefore overall performance can change depending on the hard disk drives' environment. Further yet, during shock events, parts of motors with fluid dynamic bearings or ball bearings can contact each other (e.g., metal-on-metal contact) and create metal shavings, which can affect performance of the motor and the hard disk drive 100. For example, metal shavings can become lodged in the interface between the magnetic recording media 106 and the read/write heads 114.

Use of magnetic bearings can help mitigate some of the above-described issues with fluid dynamic bearings and ball bearings. Further, use of magnetic bearings can allow use of motor assemblies with shorter heights and/or diameters compared to motors with fluid dynamic bearings or ball bearings.

In the example motor assembly 108 shown in FIG. 3, the magnetic bearing of the motor assembly 108 includes a horizontal magnetic bearing component and a vertical magnetic bearing component. The horizontal magnetic bearing component is formed by one or more pairs of magnetic poles (e.g., a first magnetic pole 132 and a second magnetic pole 134) that are spaced from each other in a horizontal direction and that have repelling magnetic polarities. For example, both the first magnetic pole 132 and the second magnetic pole 134 can have positive or negative polarities such that they repel each other (and therefore the shaft 122 and the rotor 124 components).

The first magnetic pole 132 can be coupled to or form part of the shaft 122. For example, magnets can be coupled to the shaft 122 to create the first magnetic pole 132. As another example, the shaft 122 itself can be magnetized to create the first magnetic pole 132. In certain embodiments, limited portions of the shaft 122 are magnetized as opposed to the entire shaft 122.

The second magnetic pole 134 can be coupled to or form part of the rotor 124. For example, magnets can be coupled to the rotor 124 to create the second magnetic pole 134. As another example, the rotor 124 itself can be magnetized to create the second magnetic pole 134. In certain embodiments, limited portions of the rotor 124 are magnetized as opposed to the entire rotor 124.

Because of the repelling magnetic poles and because the rotor 124 at least partially surrounds the shaft 122 (as shown in FIG. 4), the horizontal magnetic bearing component helps maintain a horizontal spacing 136 between the shaft 122 and the rotor 124. Put another way, the repelling magnetic poles help maintain an air gap between the shaft 122 and the rotor 124 such that the two components do not contact each other. During operation of the motor assembly 108 (e.g., by selectively energizing the stator windings 130), the rotor 124 can rotate around the shaft 122 without contacting the shaft 122 and without requiring a lubricant for smooth rotation. Although only one set of repelling magnetic poles are shown by reference numbers in FIG. 3, the horizontal magnetic bearing component can include multiple pairs of repelling magnetic poles to help maintain a horizontal spacing between components.

The vertical magnetic bearing component is formed, at least in part, by a lower pair of magnetic poles (e.g., a third magnetic pole 138 and a fourth magnetic pole 140) that are spaced from each other in a vertical direction and that have repelling magnetic polarities. For example, both the third magnetic pole 138 and the fourth magnetic pole 140 can have positive or negative polarities such that they repel each other.

The third magnetic pole 138 can be coupled to or form part of the floor of the base deck 102. For example, magnets or a magnetized structure (e.g., a boss-like structure) can be coupled to the base deck 102 to create the third magnetic pole 138. As another example, a portion of the base deck 102 itself can be magnetized to create the third magnetic pole 138.

The fourth magnetic pole 140 can be coupled to or form part of the rotor 124. For example, magnets can be coupled to the rotor 124 to create the fourth magnetic pole 140. As another example, the rotor 124 itself can be magnetized to create the fourth magnetic pole 140.

The vertical magnetic bearing component can further include an upper pair 142 of magnetic poles that are spaced from each other in a vertical direction and that have repelling magnetic polarities. In the example shown in FIG. 3, the upper pair 142 of magnetic poles are respectively coupled to or formed by the shaft 122 and the rotor 124. For example, the shaft 122 may include or be coupled to cap-like structure 144 or portion that extends horizontally from the shaft 122. This cap-like structure 144 can be coupled to or form a magnetic pole.

Because the force created by the repelling of the upper pair 142 of magnetic poles is in an opposite direction of the force created by the repelling of the lower pair of magnetic poles, the vertical magnetic bearing component helps maintain a vertical spacing between the shaft 122 and the rotor 124 and between the rotor 124 and both the base deck 102 and the top cover 104. Put another way, the repelling magnetic poles help maintain an air gap between these components such that the components do not contact each other. For example, the two pairs of magnetic poles cause the rotor 124 to float or levitate in the vertical direction. During operation of the motor assembly 108 (e.g., by energizing the stator windings 130), the rotor 124 can rotate around the shaft 122 without contacting the shaft 122, the floor of the base deck 102, and the top cover 104 and without requiring lubricant for smooth rotation.

Figure 5:
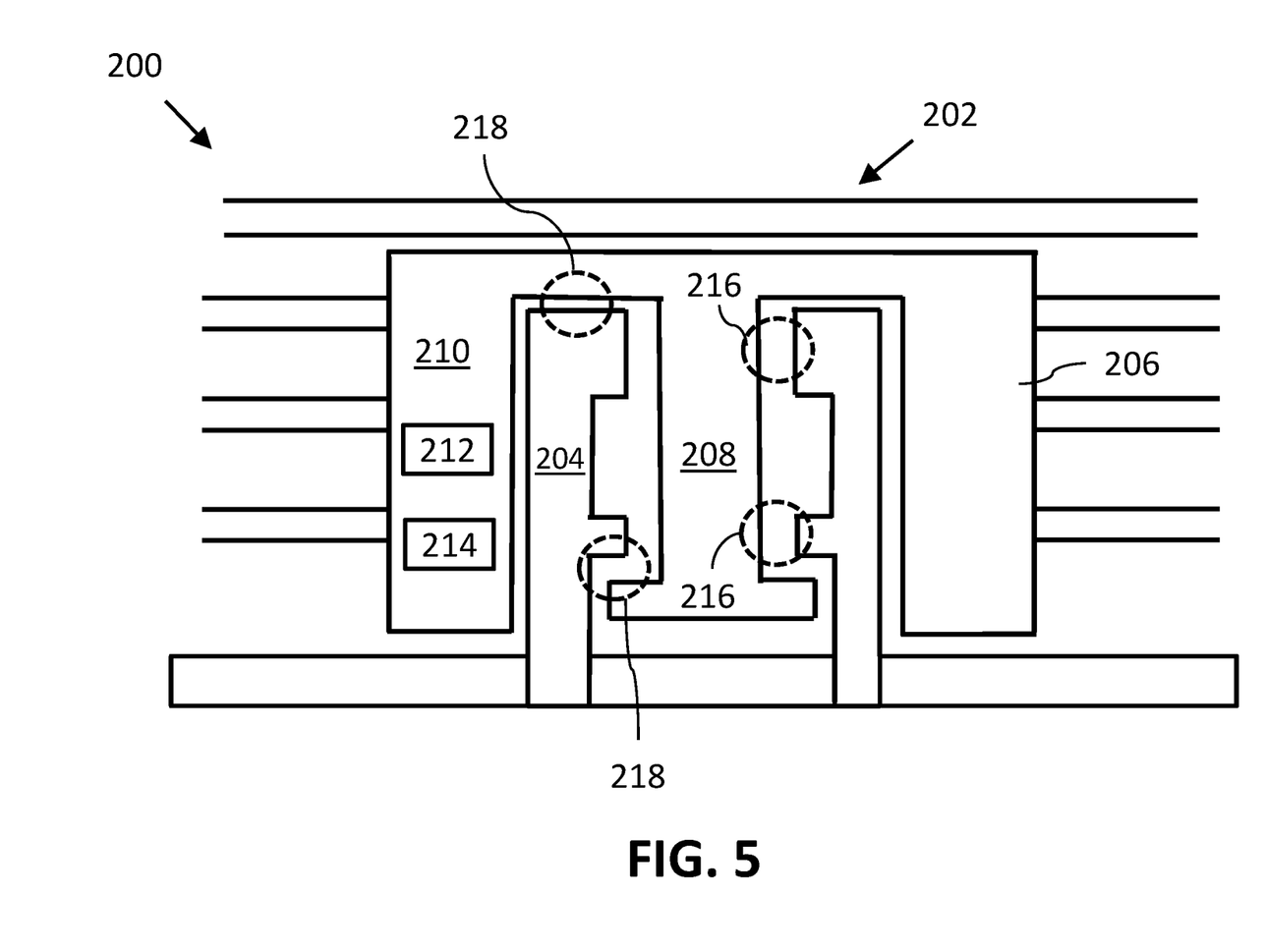
FIG. 5 shows a schematic sectional side view of a motor, in accordance with certain embodiments of the present disclosure.

FIG. 5 shows a side section view of a portion of a hard disk drive 200 with an alternative design for a motor assembly 202. Like the motor assembly 108 shown in FIGS. 3 and 4, the motor assembly 202 includes a stationary component, a rotatable component, and a magnetic bearing with a horizontal magnetic bearing component and a vertical magnetic bearing component.

In the example shown in FIG. 5, the stationary components are a sleeve 204 (e.g., cylinder-shaped sleeve with a central opening) and the rotatable component is a rotor 206 that includes a shaft 208. The sleeve 204 extends from the floor of the base deck. For example, the sleeve 204 can be coupled to the floor by securing (e.g., adhering, welding) the sleeve 204 to the floor.

The rotor 206 is coupled to or includes a hub 210. Magnetic recording media is coupled to the hub 210 such that, when the hub 210 rotates, the magnetic recording media and the rotor 206 also rotate. The particular shapes and relative positions of the components of the motor assemblies can be different than those shown in the Figures. For example, the sleeve 204 may have a single internal surface that faces the shaft 208 such that the gap between the shaft 208 and sleeve 204 is uniform along the shaft 208.

The rotor 206 is caused to rotate by an electromagnetic motor portion of the motor assembly 202. In certain embodiments, the motor assembly 202 includes magnets 212 (e.g., permanent magnets) and stator windings 214. When the stator windings 214 are selectively energized, the magnetic fields of the magnets 212 interact with the magnetic fields generated by the energized stator windings 214 to cause the hub 210 to rotate. The magnets 212 may be formed as a unitary annular ring or may be formed as a plurality of individual magnets that are spaced about the periphery of hub 210. The magnets 212 are magnetized to form two or more magnetic poles.

As noted above, components coupled to (or part of) the sleeve 204 and the rotor 206 form a magnetic bearing—as opposed to a fluid-dynamic bearing or ball bearing. In particular, the magnetic bearing is formed by pairs of repelling magnetic poles positioned at various parts along the sleeve 204 and the rotor 206. These repelling magnetic poles cause the rotor 206 to levitate or float such that there are gaps (e.g., air gaps) between the sleeve 204 and the rotor 206 and the sleeve 204 and the rotor 206 do not physically contact each other. Because the sleeve 204 and the rotor 206 do not contact each other, the motor assembly 202 does not necessarily include a lubricant between the sleeve 204 and the rotor 206 components.

In the example motor assembly 202 shown in FIG. 5, the magnetic bearing of the motor assembly 202 includes a horizontal magnetic bearing component and a vertical magnetic bearing component. The horizontal magnetic bearing component is formed by one or more pairs 216 of magnetic poles that have individual magnetic poles are spaced from each other in a horizontal direction and that have repelling magnetic polarities. In certain embodiments, the horizontal magnetic bearing component includes an upper pair of magnetic poles and a lower pair of magnetic poles. Each pair 216 of magnetic poles can have two positive or negative magnetic poles such that they repel each other.

One of the magnetic poles can be coupled to or form part of the sleeve 204. For example, magnets can be coupled to the sleeve 204 to create first magnetic pole. As another example, the sleeve 204 itself can be magnetized to create the first magnetic pole.

Another of the magnetic poles can be coupled to or form part of the rotor 206. For example, magnets can be coupled to the rotor 206 to create second magnetic pole that has the same magnetic polarity as the first magnetic pole. As another example, the rotor 206 itself can be magnetized to create the second magnetic pole. In certain embodiments, the shaft 208 of the rotor 206 includes the magnetic poles. As shown in FIG. 5, the shaft 208 is positioned within a central opening of the sleeve 204.

Because of the repelling magnetic poles and because the shaft 208 is at least partially surrounded the sleeve 204, the horizontal magnetic bearing component helps maintain a horizontal spacing between the sleeve 204 and the rotor 206. Put another way, the repelling magnetic poles help maintain an air gap between sleeve 204 and the rotor 206 such that the two components do not contact each other. During operation of the motor assembly 202, the rotor 206 can rotate around the sleeve 204 without contacting the rotor 206 and without requiring lubricant for smooth rotation.

The vertical magnetic bearing component is formed by one or more pairs 218 of magnetic poles that are spaced from each other in a vertical direction and that have repelling magnetic polarities. For example, the vertical magnetic bearing component can include a lower pair of repelling magnetic poles and an upper pair of repelling magnetic poles.

The magnetic poles 218 of the lower pair can be coupled to or form part of the sleeve 204 and a portion of the rotor 206 that extends below a portion of the sleeve 204. For example, magnets can be coupled to the sleeve 204 and the rotor 206 to create opposing magnetic poles 218. As another example, all or portions of the sleeve 204 and the rotor 206 can be magnetized to create opposing magnetic poles 218.

The magnetic poles 218 of the upper pair can be coupled to or form part of the sleeve 204 and a portion of the rotor 206 that extends over the sleeve 204. For example, magnets can be coupled to the sleeve 204 and the rotor 206 to create opposing magnetic poles. As another example, all or portions of the sleeve 204 and the rotor 206 can be magnetized to create opposing magnetic poles.

Because the force created by the repelling of the upper pair of magnetic poles is in an opposite direction of the force created by the repelling of the lower pair of magnetic poles, the vertical magnetic bearing component helps maintain a vertical spacing between the sleeve 204 and the rotor 206 and between the rotor 206 and both the base deck and the top cover. Put another way, the repelling magnetic poles help maintain an air gap between these components such that the components do not contact each other. For example, the two pairs of magnetic poles cause the rotor 206 to float or levitate. During operation of the motor assembly 202, the rotor 206 can rotate within the sleeve 204 without contacting the sleeve 204, the floor of the base deck, and the top cover and without requiring lubricant for smooth rotation.

The magnetic bearings described above allow the rotating portion(s) of the motor assemblies to rotate with respect to the stationary portion without contacting each other and without necessarily requiring a lubricated bearing. With the magnetic bearings, the rotating portion(s) can float or levitate. As described above, the magnetic poles can be created by separate magnets coupled to components of the motor assemblies or by magnetizing the components themselves. The amount of force of the magnetic fields required to levitate the rotating portion may depend on the mass of the rotating portion, the desired spacing (typically on the order of millimeters) between the components, among other factors. In certain embodiments, the various magnetic poles are created by permanent magnetics or electromagnets.

In certain embodiments, the motor assemblies are fully assembled before being installed in base decks. In other embodiments, only a subset of components of the motor assemblies are assembled together before being secured to base decks. Once secured to base decks, the rest of the components of the motor assemblies can be assembled. Once assembled, the other components of the hard disk drives can be coupled to the base decks and/or the motor assemblies.

In certain embodiments, the motor assemblies can be used to carry out various methods. As one example, the motor assemblies can be used to rotate magnetic recording media while the rotating portion of the motor assemblies levitates or floats relative to the stationary portion of the motor assemblies. As such, the rotating portion can both rotate and levitate at the same time.

Although the embodiments described above incorporate magnetic bearings in motor assemblies that rotate the magnetic recording media, the magnetic bearings can be incorporated into other components or assemblies such as pivot bearings. As mentioned above, the motor assembly 108 rotates the magnetic recording media 106 while the actuator assembly 112 is driven by the voice coil motor assembly 118 to pivot around the pivot bearing 120. Pivot bearings traditionally use ball bearings that are positioned in cages and at least partially rest in a lubricant. Like fluid-dynamic bearings, the lubricant in pivot bearings can leak from the pivot bearing and contaminate the hard disk drive. As such, in certain embodiments, the pivot bearing 120 can include a magnetic bearing instead of a ball bearings. Like the motor assemblies described above, the magnetic bearing in the pivot bearing 120 can include one or more pairs of magnetic poles. The magnetic poles can repel each other to create an air gap between a stationary component and a rotational component of the pivot bearing 120.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
   a base deck coupled to a cover;
   a motor assembly coupled to the base deck and including a stationary component with a sleeve and a rotatable component with a shaft; and
   magnetic recording media coupled to the motor assembly, the motor assembly including a magnetic bearing with a horizontal magnetic bearing component and a vertical magnetic bearing component, wherein the vertical magnetic bearing component includes an upper pair of repelling magnetic poles and a lower pair of repelling magnetic poles.

2. The hard disk drive of claim 1, wherein the horizontal magnetic bearing component includes a first pair of repelling magnetic poles.

3. The hard disk drive of claim 1, wherein the shaft is coupled to a hub, wherein the magnetic recording media are coupled to the hub.

4. The hard disk drive of claim 3, wherein the shaft includes a first magnetic pole with a first magnetic polarity, wherein the sleeve includes a second magnetic pole with a second magnetic polarity that repels the first magnetic polarity.

5. The hard disk drive of claim 1, wherein the stationary component and the rotatable component are spaced from each other.

6. The hard disk drive of claim 1, wherein the motor assembly does not include a lubricant.

7. The hard disk drive of claim 1, wherein a first portion of the shaft forms part of the upper pair of repelling magnetic poles, wherein a first portion of the sleeve forms another part of the upper pair of repelling magnetic poles.

8. The hard disk drive of claim 7, wherein a second portion of the shaft forms part of the lower pair of repelling magnetic poles, wherein a second portion of the sleeve forms another part of the lower pair of repelling magnetic poles.

9. The hard disk drive of claim 8, wherein a third portion of the shaft forms part of the horizontal magnetic bearing component, wherein a third portion of the sleeve forms another part of the horizontal magnetic bearing component.

10. The hard disk drive of claim 1, wherein the shaft includes a first magnetic pole with a first magnetic polarity, wherein the sleeve includes a second magnetic pole with a second magnetic polarity that is the same as the first magnetic polarity, wherein the first magnetic pole and the second magnetic pole form the horizontal magnetic bearing component.

11. The hard disk drive of claim 1, wherein the motor assembly further comprises stator coils.

12. The hard disk drive of claim 1, wherein the sleeve is coupled to the base deck.

13. The hard disk drive of claim 1, wherein the motor assembly does not include a fluid dynamic bearing.

14. The hard disk drive of claim 1, wherein the upper pair of repelling magnetic poles are formed by separate magnets respectively coupled to the shaft and the sleeve.

15. The hard disk drive of claim 1, wherein the upper pair of repelling magnetic poles are formed by respective portions of the shaft and the sleeve that are magnetized.

* * * * *